US009747586B1

(12) United States Patent
Frolov et al.

(10) Patent No.: US 9,747,586 B1
(45) Date of Patent: Aug. 29, 2017

(54) SYSTEM AND METHOD FOR ISSUANCE OF ELECTRONIC CURRENCY SUBSTANTIATED BY A RESERVE OF ASSETS

(71) Applicant: Private Limited Liability Company CPN Gold B.V., Amsterdam (NL)

(72) Inventors: Vladimir Nikolayevich Frolov, Yekaterinburg (RU); Damir Nasibullovich Gaynanov, Krasnogorsk (RU); Aleksey Petrovich Romanchuk, Yekaterinburg (RU); Anatoliy Anatolievich Vatolin, Yekaterinburg (RU)

(73) Assignee: CPN GOLD B.V., Amsterdam (NL)

( * ) Notice: Subject to any disclaimer, the term of this patent is extended or adjusted under 35 U.S.C. 154(b) by 0 days.

(21) Appl. No.: 15/262,569

(22) Filed: Sep. 12, 2016

Related U.S. Application Data

(60) Provisional application No. 62/355,426, filed on Jun. 28, 2016.

(51) Int. Cl.
*G06Q 40/00* (2012.01)
*G06Q 20/06* (2012.01)
*G06Q 20/36* (2012.01)
*G06Q 20/38* (2012.01)
*G06Q 40/04* (2012.01)

(52) U.S. Cl.
CPC ..... *G06Q 20/0655* (2013.01); *G06Q 20/3678* (2013.01); *G06Q 20/381* (2013.01); *G06Q 40/04* (2013.01); *G06Q 2220/00* (2013.01)

(58) Field of Classification Search
None
See application file for complete search history.

(56) References Cited

U.S. PATENT DOCUMENTS

| 6,415,271 | B1* | 7/2002 | Turk | G06Q 20/02 |
| | | | | 705/39 |
| 2015/0170112 | A1* | 6/2015 | DeCastro | G06Q 20/381 |
| | | | | 705/39 |
| 2016/0342994 | A1* | 11/2016 | Davis | G06Q 20/027 |
| 2016/0350728 | A1* | 12/2016 | Melika | G06Q 20/0655 |

* cited by examiner

*Primary Examiner* — Olabode Akintola
(74) *Attorney, Agent, or Firm* — Arent Fox LLP; Michael Fainberg

(57) ABSTRACT

Disclosed herein are system and methods for issuance and circulation of electronic currency, as well as a payment system based on use of the aforementioned electronic currency. In one exemplary aspect, the system includes a management module configured to: create and manage one or more wallets of electronic currency; manage information about a reserve substantiating the electronic currency, wherein the reserve comprises one or more tangible or intangible assets; and record electronic currency transactions in a settlement network, wherein the settlement network carries out transactions and stores data describing said transactions; and an issuance center configured to carry out centralized issuance of the electronic currency and its controlled release into circulation in the settlement network, wherein the amount of the issued electronic currency released into circulation in the settlement network is equal to or less than the amount of the reserve substantiating it.

20 Claims, 4 Drawing Sheets

SYSTEM AND METHOD FOR ISSUANCE OF ELECTRONIC CURRENCY SUBSTANTIATED BY A RESERVE OF ASSETS

CROSS-REFERENCE TO RELATED APPLICATION

This patent application claims priority to U.S. Provisional Patent Application No. 62/355,426, filed on Jun. 28, 2016, which is hereby incorporated by reference in its entirety.

FIELD OF TECHNOLOGY

The present invention relates generally to electronic currency and, in particular, to a system and method for issuance and circulation of electronic currency substantiated by a reserve of assets.

BACKGROUND

Nowadays, the so-called "idea of private money" which is embodied through a phenomenon of electronic currency (in particular, cryptocurrency) exchange becomes increasingly popular. Circulating in the USA and multiple other countries, Bitcoin cryptocurrency and other similar cryptocurrencies began a new era in economics. The growing popularity of cryptocurrencies and skyrocketing of development of technical solutions related to them are explained, primarily, by the following advantages of those cryptocurrencies:
1) ensuring a high level of safety of funds and control over expenditures of those,
2) ensuring safety of transactions,
3) impossibility of unauthorized withdrawals of funds,
4) relatively fast and low-cost way to transfer value achieved due to bypassing intermediaries and the costs and delays associated with using them, especially compared to traditional value transfer mechanisms, such as credit and debit cards, checks, and bank transfers (wire, ACH, SEPA, etc.). Except for direct (hand-to-hand) money transfers, transfers of fiat currency and other assets require validation, accounting, and/or processing by two or more financial institutions.

At the same time, current methods and systems for implementing cryptocurrencies suffer from a number of disadvantages, including but not limited to:
1) Cryptocurrencies based on blockchain technology guarantee anonymity of parties to transactions, frequently triggering inquiries by financial or tax regulatory authorities of countries.
2) Issuance of cryptocurrencies is decentralized and thus as a rule is not subject to regulation.
3) Cryptocurrencies are highly volatile compared to other stores of value because, unlike other assets, cryptocurrency has no underlying value, be it a relationship to a nation's economy (fiat currency), an earnings stream (stocks and bonds), or value to end consumers (commodities).

Currently, the advantages of cryptocurrency are significantly overshadowed by its volatility. The volatility problem may possibly lead to expenditures eventually exceeding banking fees when transferring funds in cryptocurrencies is carried out. Sellers accepting payments in cryptocurrency may, as a result of unpredictable and quick fluctuations of its rate, lose funds of a value exceeding the fees charged by the companies emitting and servicing credit cards in official currencies. Because of that, cryptocurrencies are not so widely used as a means of payment in relation to real products and services (foods, transport, clothing, etc.) or other property. The problem of volatility characteristic of cryptocurrencies has not yet been properly solved, and there is a necessity in developing systems and methods aimed at magnifying the positive effect of using cryptocurrencies in economy and trade before cryptocurrencies become operated in mass market between buyers, sellers and banks.

As noted above, the high volatility of cryptocurrencies is a consequence of their not being backed (substantiated) by a real valuable. However, this disadvantage is to a certain extent characteristic of not solely cryptocurrencies, but also state currencies including world reserve currencies which have by now strayed from a "gold standard".

The problem of lacking substantiation of currencies is considered particularly serious during economic instability periods and may lead to economic crises during which significant population groups suffer involuntary losses in the form of profit lost due to a fall in the national currency exchange rate. Historically, gold was used as a means of substantiating currencies during a long period of time. Nowadays it is commonly thought that gold-backing has had its day due to the Copernicus-Gresham's law.

The classical problem stated in the Copernicus-Gresham's law became an invincible obstacle in historical attempts to introduce a gold standard as currency substantiation. About 500 years ago, a Polish astronomer, economist and mathematician Nicolaus Copernicus and an English financier Thomas Gresham formulated an economic law: "When a government overvalues one type of money and undervalues another, the undervalued money will leave the country or disappear from circulation into hoards, while the overvalued money will flood into circulation." The "undervalued" money is such whose "inner" value exceeds its nominal one or one of the circulating "overvalued" money of an equal nominal value.

For example, some country introduces a gold standard ("undervalued" money). Let us take China with gold yuan equal to 1 g of gold as an example. For instance, there are 100 t of gold backing of this money. The issuance is limited by the gold stock amount—the amount of issued yuan is equivalent to the amount of grams, in 100 t.

In the market, there also is non-backed fiat ("overvalued") money. Its issuance is not anyhow limited. In such event, the states issuing fiat ("overvalued") money carry out a special issuance for buying out gold yuan, buy it, out and afterwards present it to the issuer, thus acquiring the whole gold reserve of 100 tons. Thus the "undervalued" gold-backed (substantiated) money leaves the country or disappears from circulation into hoards, while the "overvalued" fiat money floods into circulation." The "overvalued" money buys out the "undervalued" money.

That is, a gold-backed (substantiated) currency may be bought out for non-backed (fiat) currencies because the latter do not have limits on issuance.

The experience of the Genoa and Bretton Woods currency systems is considered an argument for failure of gold-backed currencies. They were destroyed by shortage of gold which became insufficient for substantiating currencies used for international settlements.

With a view to this, it is common to state that limitedness of gold leads to impossibility of creating a global gold-backed currency for international finances whose circulation grows faster than the gold mining industry of the planet.

An alternative to gold-backing was described by James Turk. In his U.S. Pat. Nos. 5,983,207; 7,143,062 and others, there is described a system where gold itself plays a role of a currency, i.e. gold remaining a commodity and an asset is used as a payment means at the same time. However, the system described by Turk suffers from several substantial disadvantages, including: (1) An ability of withdrawing physical gold from the system may cause a collapse of the system in event of a boost of demand for gold; (2) Restrictions on gold circulation set by states' governments may complicate carrying out operations in the system; and (3) Remaining a commodity, gold, as part of deals, is subject to taxation, which causes circulation-related expenditures upon purchasing and selling gold. In short, the "currency" offered by Turk is not, in fact, a currency.

Systems for reducing risks related to volatility of cryptocurrencies are considered in U.S. Patent Application Publication. No. 2015/0332256, filed by Halsey Minor. Minor describes a multi-currency system of payments and conversion. However, this system does not regulate aspects of cryptocurrency issuance, and does not therefore solve the problem of absence of their backing (substantiation). This is a fight with the consequence and not with the reason of the volatility problem. Furthermore, Minor's system has at least one serious disadvantage: users have to carry out a great number of transactions, continually converting different types of currencies into one another in order to, on one hand, use cryptocurrencies and their advantages and on the other, avoid the currency risks related thereto. At the same time, they still face such risks, although to a lesser extent.

As a result, there exists a need in the art for new methods and systems that solve the problem of cryptocurrencies' volatility, as well as the deficiencies identified above.

SUMMARY

The present invention provides a fully functional electronic currency free from the disadvantages characteristic of existing cryptocurrencies. Excessive volatility is overcome with the help of an effective mechanism of provision, close to a "gold standard". Volatility lowers to a level of volatility of gold (or another type of valuable asset, for example, a commodity or an intangible asset chosen as backing (substantiation)).

The present invention illustrates that substantiated currencies whose issuance mechanism is not connected to creating debt, may (despite common myths), be operable and develop not facing a problem of shortage of gold-backing.

In exemplary aspects, the invention provides a stable low-volatile electronic currency. This is not a commodity but an obligation as well as a fiat currency. However, at the same time, it is 100% substantiated by a real valuable (asset) and not a subject to any risk.

In addition, the invention solves the problem of protecting issue of backed ("undervalued") money from being bought out for fiat ("overvalued") money, via creating not a fixed-amount substantiating reserve of valuables (for example, a gold reserve) but one of amount changing depending on the demand for the substantiated money (in the form of the offered cryptocurrency). According to these aspects, in the event of a purchase of electronic currency for fiat currency in the system, there happens a purchase of substantiating valuables (for example, gold) and thus the system's gold reserve grows. In the event of withdrawal of money from the system by selling electronic currency, the client specifies the amount thereof corresponding to a certain amount of the substantiating valuable (in particular, gold), the specified amount of that valuable is withdrawn from the reserve and sold at the market price, and the client receives fiat currency at its rate at the moment of selling.

In the disclosed system, which is backed by gold, there is no emerging problem of gold shortage because the amount of substantiating gold stock changes in strict compliance with clients' orders for purchasing and selling currency. Almost instantaneous speed of carrying out transactions, achieved as well with help of an innovative reserving mechanism based on application of a certain mathematical model, allows to substantially lower the necessity in turnover gold.

Technical and organizational solutions used in Copernicus Gold, the project embodying this disclosure, ensure high circulation speed, safety, low cost and integration with existing financial institutions.

In the future, among the system's users one may see not only individuals and legal entities but state institutions of the countries interested in a stable alternative to the financial system existing nowadays.

The disclosed system for issuance and circulation of electronic currency has the potential of resurrecting the "gold standard" in international settlements.

In one exemplary aspect of the invention, a computer-based system for issuing and circulating electronic currency is disclosed, the system comprising: a management module configured to: create and manage one or more wallets of electronic currency; manage information about a reserve substantiating the electronic currency, wherein the reserve comprises one or more tangible or intangible assets; and record electronic currency transactions in a settlement network, wherein the settlement network carries out transactions and stores data describing said transactions; and an issuance center configured to carry out centralized issuance of the electronic currency and its controlled release into circulation in the settlement network, wherein the amount of the issued electronic currency released into circulation in the settlement network is equal to or less than the amount of the reserve substantiating it.

In an alternative aspect, the electronic currency is a cryptocurrency.

In an alternative aspect, a unit of counting the electronic currency is accepted as equivalent to an amount of a tangible asset; issuance of the electronic currency in the system is carried out in an amount substantiated by the reserve; and the reserve comprises said tangible assets.

In an alternative aspect, the unit of counting of the electronic currency is accepted as equivalent to 1 gram of gold.

In an alternative aspect, a unit of counting the electronic currency is accepted as equivalent to an amount of an intangible asset; issuance of the electronic currency in the system occurs in an amount substantiated by the reserve; and the reserve comprises said intangible assets.

In an alternative aspect, the management module is further configured to connect to at least one secure vault for asset storage.

In an alternative aspect, the management module is further configured to connect to at least one bank account for fiat currency storage.

In an alternative aspect, the management module is further configured to connect to at least one broker, wherein the broker comprises an entity entitled to carry out operations of purchasing/selling tangible valuables at a stock exchange.

In an alternative aspect, the management module is further configured to connect to at least one currency exchange—that performs fiat currency trading.

In an alternative aspect, the issuance center has limited access from the Internet.

In an alternative aspect, the settlement network operates using blockchain technology.

In another exemplary aspect of the invention, a computer-based method for issuing and circulating electronic currency is disclosed, the method comprising: creating and managing one or more wallets of electronic currency; managing information about a reserve substantiating the electronic currency, wherein the reserve comprises one or more tangible or intangible assets; recording electronic currency transactions in a settlement network, wherein the settlement network carries out transactions and stores data describing said transactions; and carrying out, by an issuance center, centralized issuance of the electronic currency and its controlled release into circulation in the settlement network, wherein the amount of the issued electronic currency released into circulation in the settlement network is equal to or less than the amount of the reserve substantiating it.

In an alternative aspect, the electronic currency is a cryptocurrency.

In an alternative aspect, a unit of counting the electronic currency is accepted as equivalent to an amount of a tangible asset; issuance of the electronic currency in the system is carried out in an amount substantiated by the reserve; and the reserve comprises said tangible assets.

In an alternative aspect, the unit of counting of the electronic currency is accepted as equivalent to 1 gram of gold.

In an alternative aspect, a unit of counting the electronic currency is accepted as equivalent to an amount of an intangible asset; issuance of the electronic currency in the system occurs in an amount substantiated by the reserve; and the reserve comprises said intangible assets.

In an alternative aspect, the method further comprises a step of connecting to at least one secure vault for asset storage.

In an alternative aspect, the method further comprises a step of connecting to at least one bank account for fiat currency storage.

In an alternative aspect, the method further comprises a step of connecting to at least one broker, wherein the broker comprises an entity entitled to carry out operations of purchasing/selling tangible valuables at a stock exchange.

In an alternative aspect, the method further comprises a step of connecting to at least one currency exchange that performs fiat currency trading.

In an alternative aspect, the issuance center has limited access from the Internet.

In an alternative aspect, the settlement network operates using blockchain technology.

In a third general aspect, the invention provides a method for managing asset reserves created for substantiation of electronic currency in a system, wherein the electronic currency circulates, comprising: forming a reserve stock by creating a stock of valuables; and maintaining a defined amount of valuables in the reserve stock; wherein the amount of valuables in the reserve stock increases or decreases based on a level of demand for the substantiated electronic currency.

In an alternative aspect, maintaining the amount of valuables in the reserve stock is carried out by the following steps: upon purchasing of the electronic currency in the system, buying substantiating assets in an amount coming into the system as a payment for the electronic currency, resulting in an increase of the substantiating reserve stock of the system; and upon selling of the electronic currency in a quantity equivalent to a certain amount of a substantiating asset, defined by a client, withdrawing a corresponding asset from the reserve stock in the specified quantity, and selling the asset at a market price, wherein the client receives currency from the sale at the market price.

The above simplified summary of exemplary aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more example aspects of the present disclosure and together with the detailed description, serve to explain their principles and implementations.

DETAILED DESCRIPTION

Figure 1:
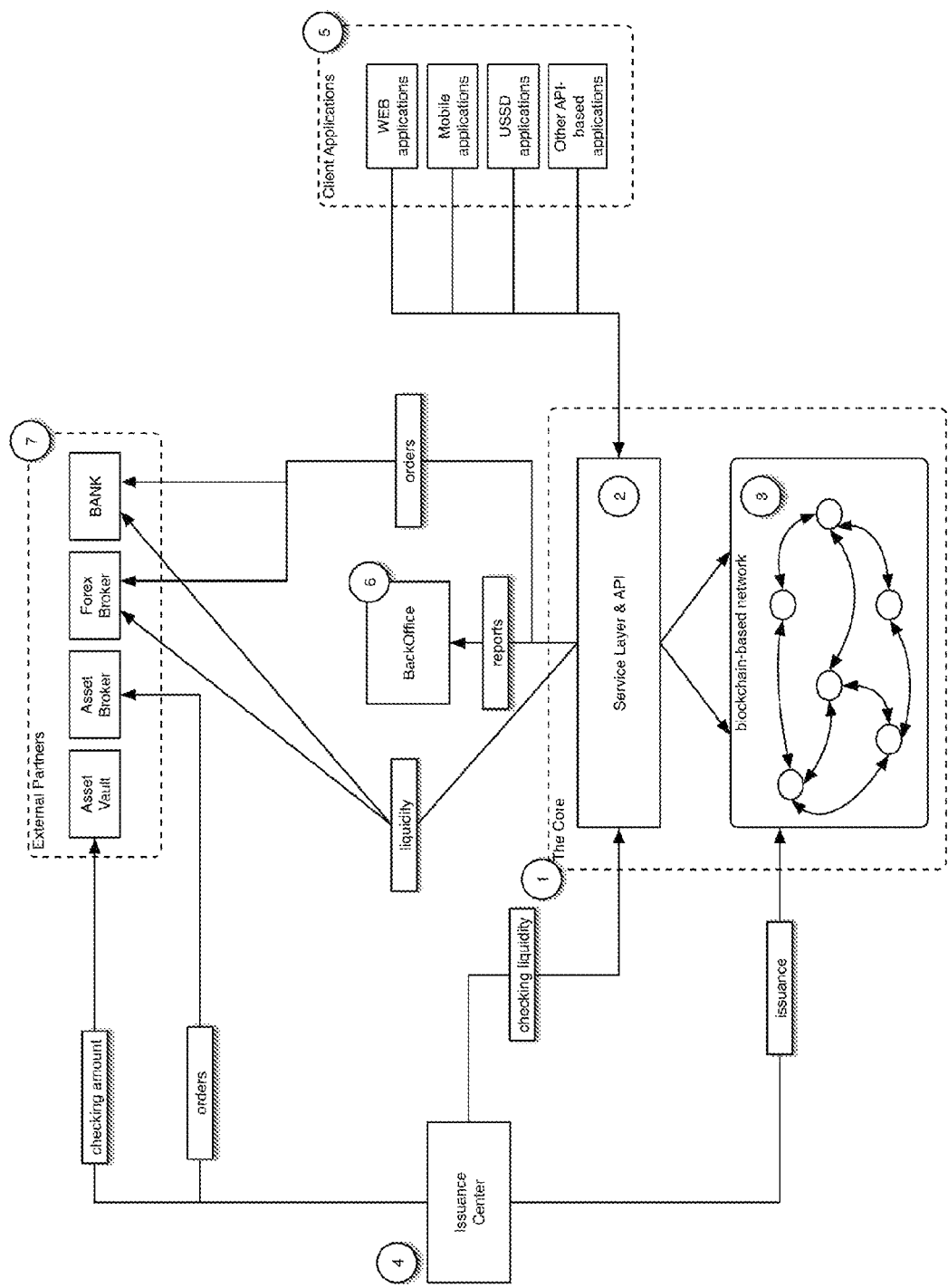
FIG. 1 illustrates an exemplary architecture of a system for issuance and circulation of electronic currency according to one aspect of the present invention.

The following definitions are provided as an aid to understanding the detailed description and claims of the present invention. The definitions apply throughout the specification and claims, except in any instances where one of ordinary skill would readily appreciate that the context clearly dictates otherwise.

Electronic currency—a conventional expression of value, having or not having a certain amount of a real valuable (money, precious metals, commodities, other assets) as an equivalent and accepted as a payment means in electronic settlement systems.

Cryptocurrency—an electronic currency whose issuance and circulation is carried, out with use of cryptotechnologies (e.g., blockchain technology).

Mining—(in the context of blockchain technology)—an action of maintaining a distributed network and creating new blocks. In existing systems built on the principles of blockchain technology, the process of generating cryptocurrency is connected to mining; currency units are created and paid as a reward for creating new blocks in the system.

Operator—in the context of the present disclosure, an entity taking control over issuance of electronic currency and functioning of the system of its circulation, including managing formation of a necessary reserve amount. An Operator may be any economic or legal entity or any individual.

Issuing center—the department of the system, real or virtual (program module), responsible for issuance of electronic currency into circulation and forming the reserves which substantiate the electronic currency.

Primary issuance—the initial issuance of electronic currency to the Operator's wallet for the substantiation provided by the Operator, carried out before launching the system.

Further issuance—the issuance of electronic currency carried out during the process, of the system's operation, in event of necessity to satisfy the demand for electronic currency on the basis of orders of the clients (users of the system).

Operator's wallet—a virtual storage (a device for storing electronic data) which is used for accounting the valuables belonging to the system's Operator.

Client's wallet—a virtual storage (a device for storing electronic data) which is used for accounting the valuables belonging to a client (a user of the system).

Transaction—a fact of transferring a certain amount of a valuable—tangible or intangible asset, e.g. gold, electronic currency, a certain commodity or rights of ownership of some property or intellectual property—recorded in the system's database (e.g., with the help of blockchain technology).

Settlement network—a system of recording transactions between the Operator and the system's clients, as well as the clients' transactions carried out between each other. In a preferred aspect of the invention, the settlement network is a distributed one operating on the basis of blockchain technology.

Data center—a server center of a distributed settlement network, functioning as a storage of virtual data of transactions carried out in the system.

Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Disclosed herein are system and methods for issuance and circulation of electronic currency, as well as a payment system based on use of the aforementioned electronic currency. In one exemplary aspect, the electronic currency is a cryptocurrency that is 100% substantiated by an tangible or intangible valuable (asset). One unit of the electronic currency according to the present invention corresponds to a certain amount of assets accepted as a substantiation means for the given currency. In one exemplary aspect, gold may be used as the substantiation means of the currency. For example, one unit of the currency may correspond to 1 gram of gold.

FIG. 1 illustrates a computer-based system for issuance and circulation of electronic currency according to one aspect of the present invention. Generally, the system comprises of a core 1, which includes a management module 2 and a settlement network 3, and a currency issuance center 4. The system may also include a plurality of client applications 5 and a back office module 6. The system may interact with external partners 7, such as a secure vault for assets storage, brokers (commodity and/or currency ones), and/or a bank.

Figure 4:
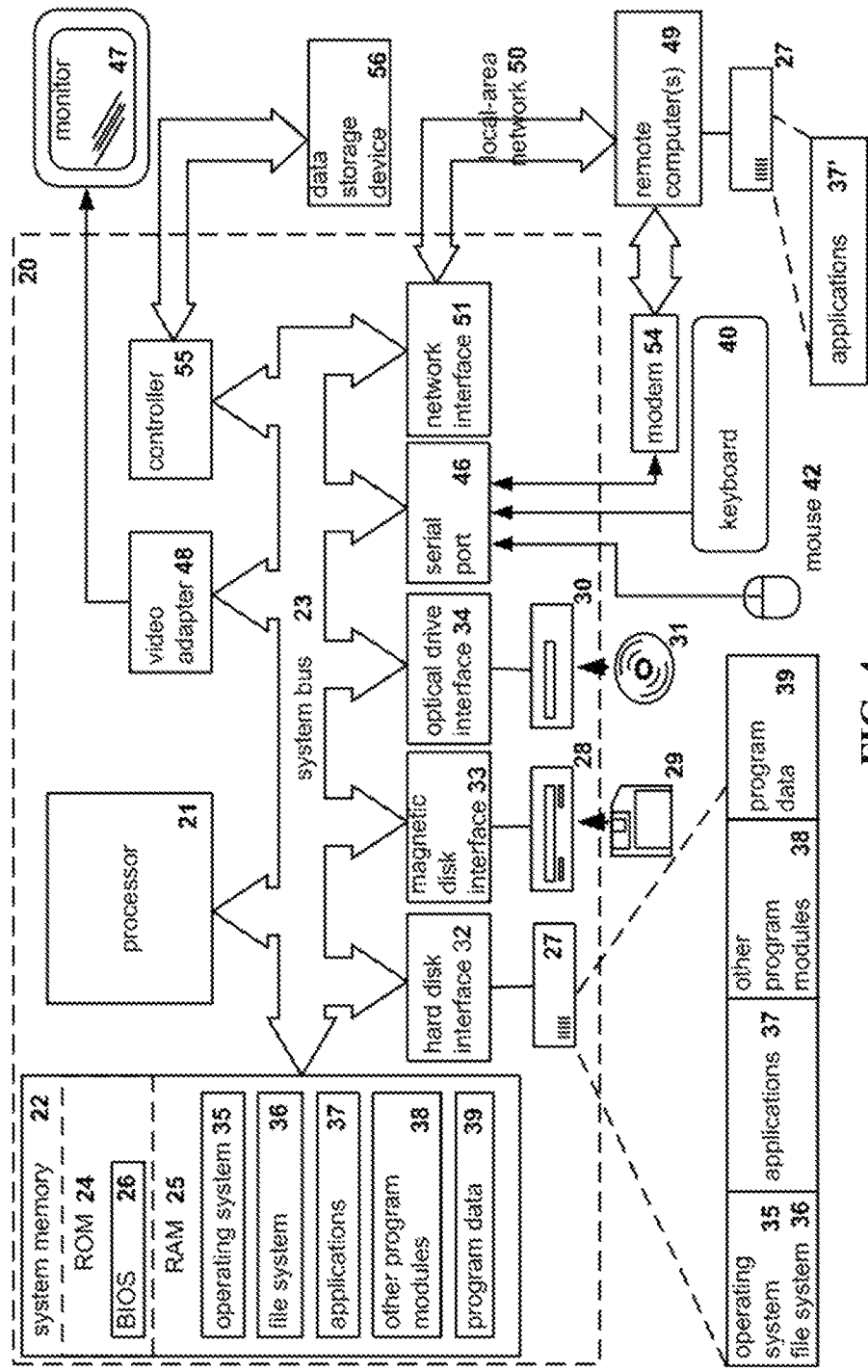
FIG. 4 illustrates an example of a general-purpose computer system on which the disclosed systems and methods can be implemented (e.g., the system of FIG. 1).

In various example aspects, the depicted components of the system for issuance and circulation of electronic currency may be implemented on a single computer system (such as a general-purpose computer system depicted in FIG. 4). In another example aspect, the components of the system may be implemented on a plurality of different computer systems located in the same local area or wide area network. Yet in another example aspect, the components of the system may be implemented on a plurality of different computer systems located in different geographically or logically distributed computers networks. In one exemplary aspect, the system may be operated and controlled by a single Operator (such as a bank, a financial organization, a commercial company, or even a government or a state-sponsored authority), which initiates and controls issuance of electronic currency. In alternative aspects, different components of the system may be operated by different entities.

In one exemplary aspect, the issuance center 4 performs the issuance of the electronic currency under the control of the Operator. For security purposes, the issuance center 4 may be isolated from the Internet either completely, e.g. being offline, or partly via, e.g., a firewall (the center "sees" the network, yet there is no, access to it from the network), or located directly in the network. In one exemplary aspect, the management module 2 may be implemented as a centralized system that provides service layer and application programming interfaces (APIs) for storing data about the system's users and their accounts, and controlling work of the settlement system, as well as accepting transactions from users.

In one exemplary aspect, the settlement network 3 may be a decentralized network of computers carrying out transactions and storing the data about them.

In one exemplary aspect, the settlement network 3 may be built on the basis of blockchain technology (e.g., private blockchain) different from known blockchain technologies used for functioning of other known cryptocurrencies (e.g., Bitcoin cryptocurrency). In exemplary aspect, the system of the present invention uses closed technology, in which all the mining is carried out on the Operator's devices. All the centers of settlement networks may be in constant synchronization with each other and are located in different datacenters, forming geographically distributed systems and thus guaranteeing fault-tolerance and safety of data. At the same time, in the disclosed system (unlike in Bitcoin), no reward is paid for mining. The process of generating electronic currency in the present system is not connected with creating new blocks in process of the system's operation. All the amount of the electronic currency (electronic cash) allocated for circulation in the system, according to the present invention, is generated upon creation of the first block at the stage of the system's launch (primary issuance) and is transferred to the pre-issuance wallet of the Operator, and from then on creating new blocks does not incur creation of new currency units. This gives the Operator of the system an ability to control all the amount of the issued currency and use this issued currency located in the pre-issuance wallet for further issuance into the system at any time the Operator prefers.

In various aspects, every user of the system, including individuals and legal entities and also the Operator itself, may have one or several wallets (accounts) which store keys letting to get access to the amounts of assets which belong to the given users. Access to the wallets may additionally be controlled by entering a special password (PIN-code), optionally with the help of a tool for multi-factor authentication (mostly USSD), so that operating a wallet without participation of its owner is absolutely impossible.

In addition, the system may include a plurality of client applications 5 (such as for example, web-applications, mobile applications, USSD-applications and others), and the back-office module 6, which gives access to analytical information about the level of liquidity in the system, and also, together with the system management module 2 ensures connection of the system with external, partners 7 and their informational systems.

In various aspects, external partners 7 may comprise one or more of the following:

1) at least one secure vault for assets storage where there is located a reserve of valuables (preferably, gold), substantiating the currency,
2) an entity entitled to trade on an appropriate stock exchange (a broker),
3) an entity entitled to carry out operations in the currency market (a currency broker),
4) in event the Operator itself is not a bank, the Bank through which there are carried out operations of purchasing and selling electronic currency between the Operator and the system's users with use of traditional payment means circulating in the banking system (for example, bank cards, bank transfers). Also, settlements are carried out through the Bank in traditional currencies with the aforementioned brokers.

In the event of use of fiat currencies as a valuable, their storage location may be the Operator's bank account.

In one exemplary aspect, the system allows its clients to create their own valuable and facilitates management of issuance of that valuable via the management module 2 and the issuance center 4. At the same time, for circulation of this valuable, a special settlement network 3 may be automatically created in the system. However, in such event, if there is physical substantiation of the valuable created and issued by the client, it is stored outside the system and is totally controlled by the issuer itself. In this aspect, in instances where one of the system's clients is the issuer of any kind of electronic valuables, the task of purchasing substantiating assets for those valuables from an appropriate broker (if necessary) is carried out by that issuer itself, in that case the issuance center of the system does not anyhow control the reserve of assets substantiating that valuable but only informs of the amount of electronic liquidity issued by the client, available in the system.

Launching the System

In one exemplary aspect, prior to launching the system, the primary issuance of electronic currency is performed. It is carried out corresponding to the initial reserve of assets, for example, a gold reserve. The initial reserve is formed by the Operator itself at its own expense.

In a preferred aspect, all the amount of the virtual currency issued by the Operator for circulation is not less than 100% backed by the reserve of assets (for example, physical gold). The substantiation reserve, in case of gold, is formed of bullions of a certain weight, and because insufficient substantiation is unacceptable, it leads to excessive substantiation.

For example, if the Mullions of gold are 1 kg of weight each, in case of receiving an order for purchasing electronic currency corresponding to 10 g of gold the Operator must purchase 1 kg of gold for maintaining the necessary reserve amount, leaving 990 g of a free reserve for executing further orders.

By gold substantiation, the Operator guarantees purchasing virtual currency from the payment system's client for an amount expressed in a traditional payment means, equal to the value of gold in correspondence to the current physical gold market conditions and active Operator's tariffs.

At the initial moment, with help of the preliminary mining procedure, the issuance center 4 creates an amount of electronic valuables maximally possible for circulation in the settlement network 3 and locates it in a special pre-issuance wallet stored in the issuance center 4. The blockchain base used for carrying out the given pre-issuance procedure may be used for establishing a settlement network 3 (by copying). After purchasing the initial amount of a valuable (for example, gold) from the broker by the Operator, the issuance center 4 carries out further issuance of electronic currency in correspondence with the purchased amount of the valuable. The issued electronic currency is transferred to the Operator's wallet in the settlement network 3 (the issuance wallet) and becomes available for sale to the end user.

Thus the virtual currency, prior to being sold to the payment system's clients, is initially issued to the Operator's wallets.

Selling virtual currency to clients is carried out from the reserves of virtual currency on the Operator's wallets upon the Operator's reception of a confirmation of the client's money receipt (or further guaranteed receipt, for example, in case of a client's payment by a bank card or other non-instantaneous ways of payment) to the Operator's bank account. Settlements in the system may be carried out in Singaporean dollars, US dollars, euros, Japanese yens and some other currencies.

Operation of the Computer-Based System

As described above with reference to FIG. 1, the system consists of the following main components: the core 1 (the settlement network 3 and the management module 2), the issuance center 4, the client applications 5 and the back-office module 6.

The core 1 is a closed part of the system, access to which is given solely to authorized employees of the Operator for maintaining continuous functioning of the system.

The client applications 5 of the system gives the client access to its wallets and to services via the USSR-service, web-interface, mobile application and also other client applications of the system developed with use of the open API.

The back-office module 6 of the system gives the Operator's employees access to information and functionality similar to the client applications 5, without enabling to manage clients' wallets. In case a client of the Operator is itself an issuer of a certain valuable it also uses the back-office module 6 to manage parameters of that valuable (for example, the rate of exchange for other valuables or the fee for carrying out operations with the valuables).

In one exemplary aspect, all settlements are carried out in settlement networks 3 which are part of the system's core. In settlement networks 3, there are circulating:

the electronic currency (valuable) purchased by clients and/or belonging to them;
the valuable belonging to the Operator and used by it to satisfy the current demand (stored on the issuance wallets of the Operator);
traditional types of currencies used by clients for storing funds and settlements.

In event the system allows issuance of own valuables by clients, such valuables are also circulating in settlement networks 3, a special own settlement network 3 may be created automatically for every such valuable. The ability to circulate traditional currencies in the system allows it to function as a fully-functional payment system.

A client (be it an individual or a legal entity), interacting with the settlement network 3 via the client network as a registered user, has a technical ability to open one or more wallets in the system, for storage and use of other valuables (fiat currencies, cryptocurrencies, commodities, bonus conventional units) in settlements with other users; said valuables are inserted into the system by the client itself or provided by the Operator or other valuables issuers registered in the system as clients.

For example, some clients—e.g., a legal entity—may register in the system its own electronic currency backed, for example, by barrels of oil and the system will provide users with an ability to open accounts (wallets) in the given electronic currency and then purchase it at the rates set by the issuer of the given valuable.

Access to the System

An individual gets access to the system upon completion of the registration procedure. An organization gets access to the system via its authorized entities that must be registered in the system as individuals. The stages of gaining access for an organization:

registration and identification of authorized entities as individuals;
provision of information about the organization;
identification of the organization.

In the system, it is allowed to carry out operations by not fully authorized users (for example, upon specifying only a mobile phone number when registering) in terms of the limits set by the regulator of the jurisdiction which the Operator works under.

In general, the offered system strays from the principle of settlement anonymity, which allows to restrict use of the system for carrying out illegal operations.

After registration, every user of the system may open one or several wallets (accounts) in a preferred valuable or currency (for example, gold, usual fiat currencies), including the valuables which are registered by other users of the system managing issuance of that valuable themselves. Access to wallets is at all times controlled by a password (PIN-code) which a client enters via. USSD (or another protected channel for double-factor authentication), thus impossibility of unauthorized access to wallets is guaranteed.

Control Over Reserve Formation

In one exemplary aspect, the issuance center 4 repeatedly analyzes the condition of the valuables reserve (e.g., the amount of gold) which is owned by the Operator in a specialized storage, and on the basis of the offered method of management of the reserve transfers an order for purchase of the necessary amount of a valuable to the broker via the back-office module. Upon completion of purchasing of the valuable by the broker, the issuance center 4 carries out additional (further) issuance which is also transferred to the settlement network 3. The issuance center 4 detects the flow of user orders and in case the total amount of orders for purchase of electronic currency exceeds the volume of the issued currency, a request for purchase of backing (substantiating) reserve valuables from a broker is automatically formed, at the same time the service of orders for purchase of electronic currency of the volume exceeding the issued one is ceased until the moment of confirmation of purchasing gold and carrying out additional issuance.

In one exemplary aspect, the volume of the virtual currency reserves necessary for successful functioning of the system may be defined on the basis of a mathematical model calculating the dynamics of the demand for the virtual currency. If during the continuous monitoring of sufficiency of reserves with help of the mathematical model the system detects that received orders of purchase of an amount of electronic currency exceed the amount of the reserves on the Operator's wallets, at first the amount of gold necessary for compliance with the norms is purchased, after which issuance of virtual currency is carried out and the issued currency is transferred to the client's wallet. This approach guarantees rigorous observance of the principle of 100% backing of the virtual currency by physical gold.

Substantiation of Currency

In one exemplary aspect, the Operator ensures presence of an appropriate amount of gold for every unit of currency at any moment.

The total amount of gold in the system's storage should be equal to, but in no case less than the sum of gold in the clients' and issuance wallets and the spare gold.

Spare gold may appear in the system in the following events:

when the Operator has purchased gold but has not yet issued currency (the situation occurs because issuance may be carried out in the offline mode, for safety reasons),
when the Operator has withdrawn currency from the system but has not yet sold the "freed" gold.

The data about the purchased and sold gold are entered into the system by the Operator.

Purchasing and Selling Gold

Purchasing and selling gold may be carried out by the Operator when and as necessary.

Calculation of the necessary amount of gold may be carried out by the above-mentioned mathematical model of liquidity balance maintenance.

As orders for purchasing or selling gold are received, the system calculates the amounts of gold that needs to be purchased or sold on the external market.

In event of carrying out an operation of purchasing gold in the system, the system makes a recording of the following data for every purchased bullion:

1) the weight of the bullion (mentioning the measurement unit);
2) the state of the bullion's production;
3) the bullion's producer;
4) the data of the certificate confirming authenticity of gold (certificate number, date of issue);
5) the bullion's serial number.

During carrying out an operation of selling gold, the following actions are carried out:

1. In the back-office module of the system, there is created an order for selling, which contains the following data:
    the weight of the gold sold (mentioning the measurement unit);
    name of the purchaser of the gold.
2. There are recorded the statuses of the order for selling:
    draft (the order has been created but not received by the system);
    pending confirmation (the order is received by the system, but the purchaser of the gold has not confirmed its execution);
    completed (the gold has been sold);

canceled (the order in the status of "Pending confirmation" is canceled by an authorized employee of the Operator).

The system withdraws currency from issuance wallets, "freeing" gold of the necessary amount, and then forms an order for selling in the status of "Pending confirmation".

After verifying and confirming the order, the system forms a range of the bullions subject to sale in terms of the order.

After the system has formed the range of the bullions subject to sale, the order for selling gold is directed to the purchaser in a way agreed with the purchaser.

The fact of selling the gold is recorded in the system after the gold has been sold.

In the system, the following occurs automatically:
the order status is changed to "completed";
the bullions reserved by the order for selling are marked as sold.

In the event of growth of popularity of the offered currency as a means of saving, the gold substantiation will grow proportionally to this demand. High liquidity of the global market allows to timely ensure such increase of gold-backing. Besides, the growing demand for savings in the substantiated currency will lead to growth of the gold price, which means a smaller amount of gold will substantiate a bigger amount of savings.

Carrying out payments in the system almost instantaneously ensures high speed of funds turnover. This allows to minimize the amount of currency necessary for servicing the trade turnover.

Figure 2:
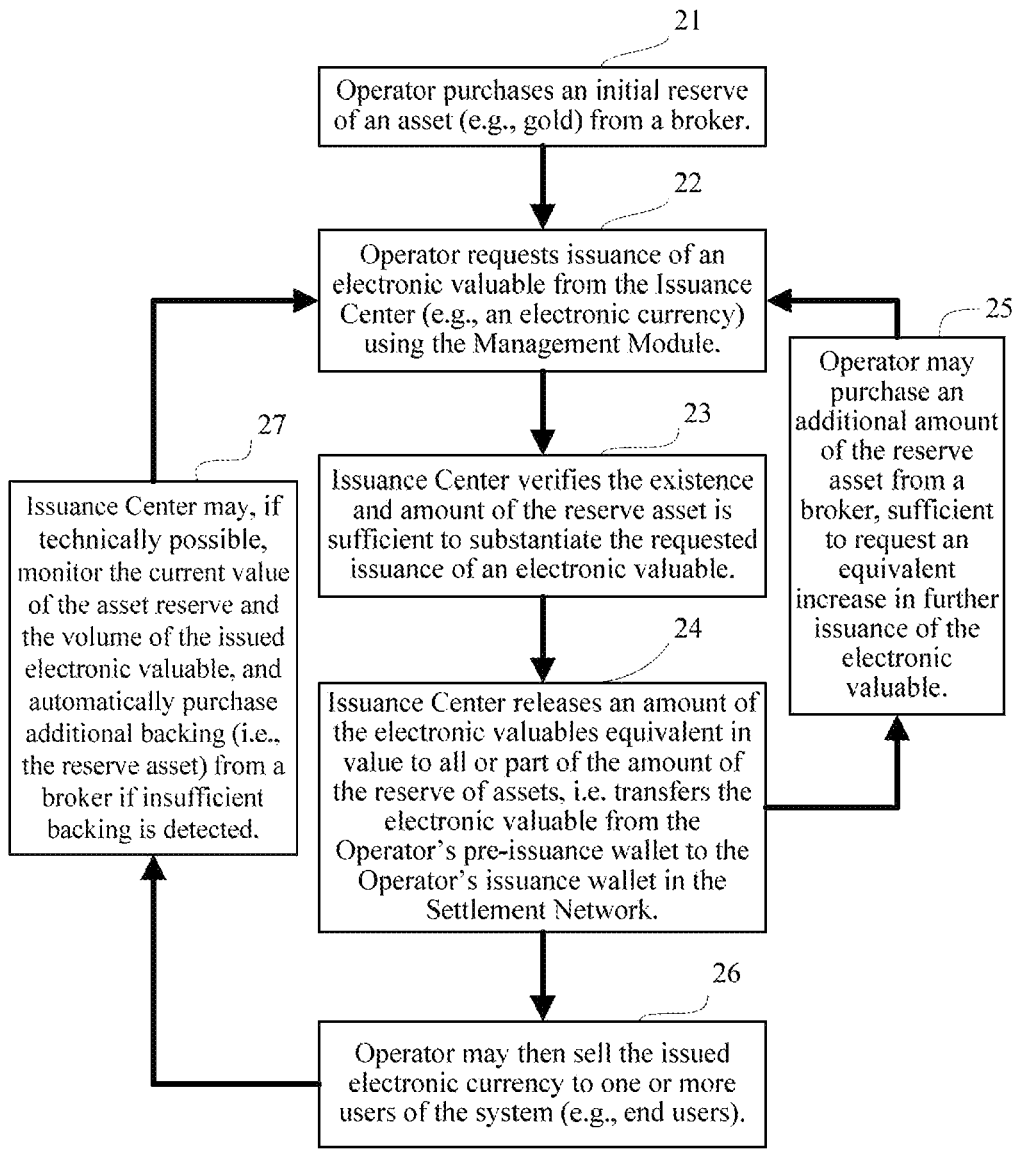
FIG. 2 is a flowchart illustrating one method of operation of the system for issuance and circulation of electronic currency according to an exemplary aspect of the present invention.

FIG. 2 illustrates one exemplary method of operation of the system for issuance and circulation of electronic currency illustrated in FIG. 1, and in particular a method of the Operator working with the system. At step 21, the Operator may purchase an initial reserve of an asset (e.g., gold) from a broker. At step 22, the Operator may request issuance of an electronic valuable from the Issuance Center (e.g., an electronic currency) using the Management Module. At step 23, the Issuance Center verifies the existence and amount of the reserve asset is sufficient to substantiate the requested issuance of an electronic valuable. At step 24, the Issuance Center releases an amount of the electronic valuables equivalent in value to all or part of the amount of the reserve of assets, i.e. transfers the electronic valuable from the Operators pre-issuance wallet to the Operator's issuance wallet in the Settlement Network. At step 25, the Operator may purchase an additional amount of the reserve asset from a broker, sufficient to request an equivalent increase in further issuance of the electronic valuable. At step 26, the Operator may then sell the issued electronic currency to one or more users of the system (e.g., end users). At step 27, the Issuance Center may, if technically possible, monitor the current value of the asset reserve and the volume of the issued electronic valuable, and automatically purchase additional backing (i.e., the reserve asset) from a broker if insufficient backing is detected.

Figure 3:
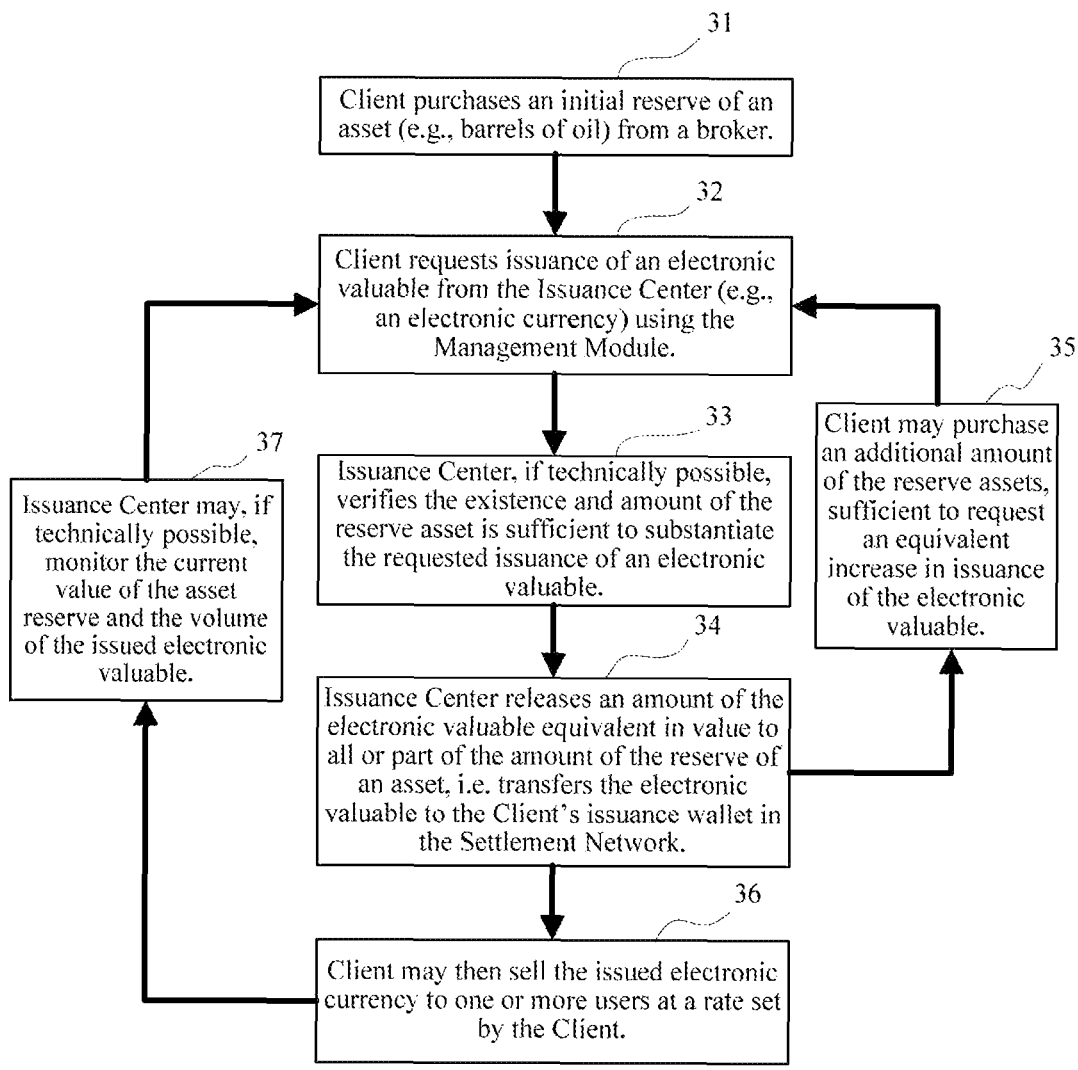
FIG. 3 is a flowchart illustrating another method of operation of the system for issuance and circulation of electronic currency according to an alternative aspect of the present invention.

FIG. 3 illustrates another exemplary method of operation of the system for issuance and circulation of electronic currency illustrated in FIG. 1, and in particular a method of the Client working with the system. At step 31, the Client purchases an initial reserve of an asset (e.g., barrels of oil or fiat currency) from a broker. At step 32, the Client requests issuance of an electronic valuable from the Issuance Center (e.g., an electronic currency) using the Management Module. At step 33, the Issuance Center, if technically possible, verifies the existence and amount of the reserve asset is sufficient to substantiate the requested issuance of an electronic valuable. Such technical possibility may exist e.g. in case the Client substantiates its electronic valuables by, assets stored in its wallets in the system (e.g. fiat currency wallets). At step 34, the Issuance Center releases an amount of the electronic valuable equivalent in value to all or part of the amount of the reserve of an asset, i.e. transfers the electronic valuable to the Client's issuance wallet in the Settlement Network. At step 35, the Client may purchase an additional amount of the reserve assets, sufficient to request an equivalent increase in issuance of the electronic valuable. At step 36, Client may then sell the issued electronic currency to one or more users at a rate set by the Client. At step 37, the Issuance Center may, if technically possible, monitor the current value of the asset reserve and the volume of the issued electronic valuable.

FIG. 4 illustrates an example of a general-purpose computer system (which may be a personal computer or a server) on which the disclosed systems and methods can be implemented. It should be appreciated that the detailed general-purpose computer system can correspond to the computer system described above with respect to FIG. 1.

As shown in FIG. 4, the computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28 and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-based system for issuing and managing electronic currency substantiated by a gold reserve, comprising:
   a management module, executable by a computer processor, configured to:
      create and manage one or more wallets of electronic currency for a system operator and a plurality of clients;
      execute electronic currency payment transactions by transferring electronic currency between one or more wallets of the system operator and/or a plurality of clients and recording information about the executed transactions in a private blockchain-based settlement network;
      manage information about the gold reserve substantiating the electronic currency and control in real-time purchase or sale of gold on an external market in an amount required to fully substantiate the issued electronic currency at each moment of time; and
   an issuance center, executable by a computer processor, configured to:
      receive in real-time information from the management module concerning an amount of the gold reserve substantiating the electronic currency;
      perform centralized generation and controlled issuance of the electronic currency into circulation, wherein the generation of all of the electronic currency is performed in a single block by creating this block in a blockchain using a mining operation that generates a maximum possible amount of the electronic currency, and wherein the generated electronic currency is issued into circulation in an amount equal to or less than the amount of the gold reserve substantiating it;
      when the amount of gold reserve reaches a threshold amount, calculate, by the computer processor, in real-time, an amount of gold to be sold or purchased on the external market in order to fully substantiate the issued electronic currency based on a set of mathematical functions that account for distributions of moments of time of receiving from the clients orders for purchasing or selling of electronic currency using a fiat currency and size of the received orders, and
      transmit to the management module an order to purchase or sell the calculated amount of gold, on the external market, to maintain a sufficient amount of reserve to fully substantiate the electronic currency at each moment of time.

2. The system of claim 1, wherein the electronic currency is a cryptocurrency.

3. The system of claim 1, wherein a unit of counting the electronic currency is accepted as equivalent to an amount of gold.

4. The system of claim 3, wherein the unit of counting of the electronic currency is accepted as equivalent to 1 gram of gold.

5. The system of claim 1, wherein the management module is further configured to connect to at least one secure vault for storing some or all of the gold reserve.

6. The system of claim 1, wherein the management module is further configured to connect to at least one broker that carries out operations of purchasing or selling of gold on the external market.

7. The system of claim 1, wherein the distributions of moments of time are defined by Poisson streams and are combined into a single Poisson stream in which the order type is defined randomly, and the size of the orders for the purchase or sale of the electronic currency is defined by a logarithmically normal distribution, such that a positive amount value is assigned to orders for selling electronic currency and a negative amount value for orders for purchasing electronic currency.

8. The system of claim 1, wherein the mathematical functions for calculating the amount of gold to be sold $G^*_{sell}(t)$ or purchased $G^*_{buy}(t)$, on the external market at given time t, include:

$$G^*_{buy}(t) = \alpha \cdot G'_{buy}(t) + (1-\alpha) G''_{buy}(t),$$

and $$G^*_{sell}(t) = \alpha \cdot G'_{sell}(t) + (1-\alpha) G''_{sell}(t);$$

where
$\alpha \in [0,1]$;
"$G^*_{buy}(t)$" is the amount of gold to be purchased on the external market;
"$G^*_{sell}(t)$" is the amount of gold to be sold on the external market;
"$G'_{buy}(t)$"=$|a(t)| \cdot of_{buy}(t) + G_{buy}(t) \cdot (1-of_{buy}(t)) \cdot G_{buy}$;
"$G'_{sell}(t)$"=$a(t) \cdot of_{sell}(t) + G_{sell}(t) \cdot (1-of_{sell}(t)) \cdot G_{sell}$;
"$G''_{buy}(t)$"=$G_{buy}(t) \cdot (|a(t)| \cdot (1-of_{buy}(t)) - g(t) - g_{pir}(t) + G_{min} + G_{buy}) + of_{buy}(t) \cdot |a(t)|$;
"$G''_{sell}(t)$"=$G_{sell}(t) \cdot (a(t) \cdot (1-of_{sell}(t)) + g(t) + g_{pir}(t) - G_{max} + G_{sell}) + of_{sell}(t) \cdot a(t)$;
"$a(t)$" is the amount of the order at the moment of time t; if $a(t)>0$, the client sells the electronic currency, if $a(t)<0$ the client purchases the electronic currency;
"$of_{buy}(t)$"=1, if $a(t)<0$ and $(g(t)+a(t))<\Delta$, otherwise $of_{buy}(t)=0$;
"$of_{sell}(t)$"=1, if $a(t)>0$ and $(c(t)-e \cdot a(t))<e \cdot \Delta$, otherwise $of_{sell}(t)=0$;
"$G_{buy}(t)$"=1, if $(g(t)+(1-of_{buy}(t)) \cdot a(t) + g_{pir}(t))<G_{min}$, otherwise $G_{buy}(t)=0$;
"$G_{sell}(t)$"=1, if $(g(t)+(1-of_{sell}(t)) \cdot a(t) + g_{pir}(t))>G_{max}$, otherwise $G_{sell}(t)=0$;
"$G(t)$" is a total amount of gold in the reserve at the moment of time t;
"$g(t)$" is an amount of a portion of G(t) owned by an operator of the gold reserve and comprising the operator's free gold reserve at the moment of time t;
"$g_{pir}(t)$" is the amount of gold in transit expected to arrive to the operator's reserves; it is not at the moment of time t at the operator's disposal due to the length $T_b$ of the operation of purchasing gold in the external market;
"$G_{min}$" is a threshold minimum amount of g(t), necessary to fully substantiate the electronic currency, which triggers the purchase of the portion of the gold for the reserve on the external market;
"$G_{max}$" is a threshold maximum amount of g(t), sufficient to fully substantiate the electronic currency, which triggers the sale of the portion of the gold from the reserve on the external market;
"$\Delta$" is a fixed purchased/sold amount of gold which can be purchased or sold on the external market with a low commission;
"e" is the cost of a given unit of gold; and "c(t)" is an amount of fiat currency in an account controlled by the operator of the gold reserve at a given moment of time t.

9. The system of claim 8, wherein the variables $G^*_{buy}(t)$ and $G^*_{sell}(t)$ are rounded to a value of $\hat{G}^*_{buy}(t)$ and $\hat{G}^*_{sell}(t)$, respectively, which are each divisible by the fixed purchased or sold amount of gold ($\Delta$), based on the following formulas:

$$\hat{G}^*_{buy}(t_k) = \begin{cases} \left\lceil \frac{G^*_{buy}(t_k)}{\Delta} \right\rceil \cdot \Delta, \text{ if } k = 1; \\ \left\lfloor \frac{G^*_{buy}(t_k)}{\Delta} \right\rfloor \cdot \Delta, \text{ if } \sum_{i=1}^{k-1} \delta_{buy}(t_i) + \left\lceil \frac{G^*_{buy}(t_k)}{\Delta} \right\rceil \cdot \Delta - G^*_{buy}(t_k) < \Delta, k \geq 2; \\ \left\lfloor \frac{G^*_{buy}(t_k)}{\Delta} \right\rfloor \cdot \Delta, \text{ if } \sum_{i=1}^{k-1} \delta_{buy}(t_i) + \left\lceil \frac{G^*_{buy}(t_k)}{\Delta} \right\rceil \cdot \Delta - G^*_{buy}(t_k) \geq \Delta, k \geq 2; \end{cases}$$

and $$\hat{G}^*_{sell}(t_k) = \begin{cases} \left\lceil \frac{G^*_{sell}(t_k)}{\Delta} \right\rceil \cdot \Delta, \text{ if } k = 1; \\ \left\lfloor \frac{G^*_{sell}(t_k)}{\Delta} \right\rfloor \cdot \Delta, \text{ if } \sum_{i=1}^{k-1} \delta_{sell}(t_i) + \left\lceil \frac{G^*_{sell}(t_k)}{\Delta} \right\rceil \cdot \Delta - G^*_{sell}(t_k) < \Delta, k \geq 2; \\ \left\lfloor \frac{G^*_{sell}(t_k)}{\Delta} \right\rfloor \cdot \Delta, \text{ if } \sum_{i=1}^{k-1} \delta_{sell}(t_i) + \left\lceil \frac{G^*_{sell}(t_k)}{\Delta} \right\rceil \cdot \Delta - G^*_{sell}(t_k) \geq \Delta, k \geq 2; \end{cases}$$

where the following variables are defined:
"$(t_k)$" a given k-th moment of time in a series of moments $t_1, t_2, \ldots$;
"$\delta_{buy}(t_k)$"=$\hat{G}^*_{buy}(t_k) - G^*_{buy}(t_k)$; and
"$\delta_{sell}(t_k)$"=$\hat{G}^*_{sell}(t_k) - G^*_{sell}(t_k)$.

10. The system of claim 8, wherein $g_{pir}(t)$, g(t), g*(t), G(t), $c_{pir}(t)$, c(t), for moments t=$t_k$, (k=1, 2, ...) are calculated successively by the following formulas:

$$g_{pir}(t_{k+1}) = g_{pir}(t_k) + \hat{G}^*_{buy}(t_k) - of_{buy}(t_k) \cdot |a(t_k)| - \hat{G}^*_{buy}(rnd(t_k-T_b)) + of_{buy}(rnd(t_k-T_b)) \cdot |a(rnd(t_k-T_b))|;$$

$$g(t_{k+1}) = g(t_k) + a(t_k) \cdot (1 - of_{buy}(t_k) - of_{sell}(t_k)) + \hat{G}^*_{buy}(rnd(t_k-T_b)) - of_{buy}(rnd(t_k-T_b)) \cdot |a(rnd(t_k-T_b))| - \hat{G}^*_{sell}(t_k) + of_{sell}(t_k) \cdot a(t_k);$$

$$g^*(t_{k+1}) = g^*(t_k) - a(t_k) \cdot (1 - of_{buy}(t_k) - of_{sell}(t_k)) + of_{buy}(rnd(t_k-T_b)) \cdot |a(rnd(t_k-T_b))| - _{sell}(t_k) \cdot a(t_k);$$

$$G(t_{k+1}) = g(t_{k+1}) + g^*(t_{k+1});$$

$$c_{pir}(t_{k+1}) = c_{pir}(t_k) + e \cdot \hat{G}^*_{sell}(t_k) - e \cdot of_{sell}(t_k) \cdot a(t_k) - e \cdot \hat{G}^*_{sell}(rnd(t_k-T_s)) + e \cdot of_{sell}(rnd(t_k-T_s)) \cdot a(rnd(t_k-T_s));$$

$$c(t_{k+1}) = c(t_k) - e \cdot a(t_k) \cdot (1 - of_{buy}(t_k) - of_{sell}(t_k)) - e \cdot \hat{G}^*_{buy}(t_k) + e \cdot of_{buy}(t_k)|a(t_k)| + e \cdot \hat{G}^*_{sell}(rnd(t_k-T_s)) - e \cdot of_{sell}(rnd(t_k-T_s)) \cdot a(rnd(t_k-T_s));$$

wherein rnd(t) denotes the moment closest to t on the left in the stream of orders for purchasing/selling of the electronic currency, and at the same time by the definition the following holds true:

$$rnd(t_k-T_b)=0 \forall t_k \in [t_1; t_1+T_b);$$

$$rnd(t_k-T_s)=0 \forall t_k \in [t_1; t_1+T_s); \text{ and}$$

"$T_b/T_s$" is time required for purchasing or selling units of gold on the external market.

11. A non-transitory, computer-readable medium storing computer-executable instructions for issuing and managing electronic currency substantiated by a gold reserve, including instructions for:

creating and managing one or more wallets of electronic currency for a system operator and a plurality of clients, by a management module executable by a computer processor;

executing electronic currency payment transactions by transferring electronic currency between one or more wallets of the system operator and/or a plurality of clients and recording information about the executed transactions in a private blockchain-based settlement network, by the management module;

managing information about the gold reserve substantiating the electronic currency and controlling in real time purchase or sale of gold on an external market in an amount required to fully substantiate the issued electronic currency at each moment of time, by the management module; and receiving in real time information from the management module concerning an amount of the gold reserve substantiating the electronic currency, by an issuance center executable by a computer processor;

performing centralized generation and controlled issuance of the electronic currency into circulation, wherein the generation of all of the electronic currency is performed in a single block by creating this block in a blockchain using a mining operation that generates a maximum possible amount of the electronic currency, and wherein the generated electronic currency is issued into circulation in an amount equal to or less than the amount of the gold reserve substantiating it, by the issuance center;

when the amount of gold reserve reaches a threshold amount, calculating, in real time, an amount of gold to be sold or purchased on the external market in order to fully substantiate the issued electronic currency based on a set of mathematical functions that account for distributions of moments of time of receiving from the clients orders for purchasing or selling of electronic currency using a fiat currency and size of the received orders, by the issuance center, and transmitting to the management module an order to purchase or sell the calculated amount of gold, on the external market, to maintain a sufficient amount of reserve to fully substantiate the electronic currency at each moment of time, by the issuance center.

12. The non-transitory computer-readable medium of claim 11, wherein the electronic currency is a cryptocurrency.

13. The non-transitory computer-readable medium of claim 11, wherein a unit of counting the electronic currency is accepted as equivalent to an amount of gold.

14. The non-transitory computer-readable medium of claim 13, wherein the unit of counting of the electronic currency is accepted as equivalent to 1 gram of gold.

15. The non-transitory computer-readable medium of claim 11, wherein the management module is further configured to connect to at least one secure vault for storing some or all of the gold reserve.

16. The non-transitory computer-readable medium of claim 11, further comprising instructions for connecting, by the management module, to at least one broker that carries out operations of purchasing or selling of gold on the external market.

17. The non-transitory computer-readable medium of claim 11, wherein the distributions of moments of time are defined by Poisson streams and are combined into a single Poisson stream in which the order type is defined randomly, and the size of the orders for the purchase or sale of the electronic currency is defined by a logarithmically normal distribution, such that a positive amount value is assigned to orders for selling electronic currency and a negative amount value for orders for purchasing electronic currency.

18. The non-transitory computer-readable medium of claim 11, wherein the mathematical functions for calculating the amount of gold to be sold $G^*_{sell}(t)$ or purchased $G^*_{buy}(t)$, on the external market at given time t, include:

$$G^*_{buy}(t)=\alpha \cdot G'_{buy}(t)+(1-\alpha)G''_{buy}(t),$$

and $$G^*_{sell}(t)=\alpha \cdot G'_{sell}(t)+(1-\alpha)G''_{sell}(t);$$

where
- $\alpha \in [0,1]$;
- "$G^*_{buy}(t)$" is the amount of gold to be purchased on the external market;
- "$G^*_{sell}(t)$" is the amount of gold to be sold on the external market;
- "$G'_{buy}(t)$"$=|a(t)| \cdot of_{buy}(t)+G_{buy}(t) \cdot (1-of_{buy}(t)) \cdot G_{buy}$;
- "$G'_{sell}(t)$"$=a(t) \cdot of_{sell}(t)+G_{sell}(t) \cdot (1-of_{sell}(t)) \cdot G_{sell}$;
- "$G''_{buy}(t)$"$=G_{buy}(t) \cdot (|a(t)| \cdot (1-of_{buy}(t))-g(t)-g_{pir}(t)+G_{min}+G_{buy})+of_{buy}(t) \cdot |a(t)|$;
- "$G''_{sell}(t)$"$=G_{sell}(t) \cdot (a(t) \cdot (1-of_{sell}(t))+g(t)+g_{pir}(t)-G_{max}+G_{sell})+of_{sell}(t) \cdot a(t)$;
- "$a(t)$" is the amount of the order at the moment of time t; if $a(t)>0$, the client sells the electronic currency, if $a(t)<0$ the client purchases the electronic currency;
- "$of_{buy}(t)$"$=1$, if $a(t)<0$ and $(g(t)+a(t))<\Delta$, otherwise $of_{buy}(t)=0$;
- "$of_{sell}(t)$"$=1$, if $a(t)>0$ and $(c(t)-e \cdot a(t))<e \cdot \Delta$, otherwise $of_{sell}(t)=0$;
- "$G_{buy}(t)$"$=1$, if $(g(t)+(1-of_{buy}(t)) \cdot a(t)+g_{pir}(t))<G_{min}$, otherwise $G_{buy}(t)=0$;
- "$G_{sell}(t)$"$=1$, if $(g(t)+(1-of_{sell}(t)) \cdot a(t)+g_{pir}(t))>G_{max}$, otherwise $G_{sell}(t)=0$;
- "$G(t)$" is a total amount of gold in the reserve at the moment of time t;
- "$g(t)$" is an amount of a portion of $G(t)$ owned by an operator of the gold reserve and comprising the operator's free gold reserve at the moment of time t;
- "$g_{pir}(t)$" is the amount of gold in transit expected to arrive to the operator's reserves; it is not at the moment of time t at the operator's disposal due to the length $T_b$ of the operation of purchasing gold in the external market;
- "$G_{min}$" is a threshold minimum amount of $g(t)$, necessary to fully substantiate the electronic currency, which triggers the purchase of the portion of the gold for the reserve on the external market;
- "$G_{max}$" is a threshold maximum amount of $g(t)$, sufficient to fully substantiate the electronic currency, which triggers the sale of the portion of the gold from the reserve on the external market;
- "$\Delta$" is a fixed purchased/sold amount of gold which can be purchased or sold at the external market with a low commission;
- "e" is the cost of a given unit of the gold; and "c(t)" is an amount of fiat currency in an account controlled by the operator of the gold reserve at a given moment of time t.

19. The non-transitory computer-readable medium of claim 18, wherein the variables $G^*_{buy}(t)$ and $G^*_{sell}(t)$ are rounded to a value of $\hat{G}^*_{buy}(t)$ and $\hat{G}^*_{sell}(t)$, respectively, which are each divisible by the fixed purchased or sold amount of gold ($\Delta$), based on the following formulas:

$$\hat{G}^*_{buy}(t_k) = \begin{cases} \left\lceil \frac{G^*_{buy}(t_k)}{\Delta} \right\rceil \cdot \Delta, & \text{if } k = 1; \\ \left\lfloor \frac{G^*_{buy}(t_k)}{\Delta} \right\rfloor \cdot \Delta, & \text{if } \sum_{i=1}^{k-1} \delta_{buy}(t_i) + \left\lceil \frac{G^*_{buy}(t_k)}{\Delta} \right\rceil \cdot \Delta - G^*_{buy}(t_k) < \Delta, k \geq 2; \\ \left\lceil \frac{G^*_{buy}(t_k)}{\Delta} \right\rceil \cdot \Delta, & \text{if } \sum_{i=1}^{k-1} \delta_{buy}(t_i) + \left\lceil \frac{G^*_{buy}(t_k)}{\Delta} \right\rceil \cdot \Delta - G^*_{buy}(t_k) \geq \Delta, k \geq 2; \end{cases}$$

and $$\hat{G}^*_{sell}(t_k) = \begin{cases} \left\lceil \frac{G^*_{sell}(t_k)}{\Delta} \right\rceil \cdot \Delta, & \text{if } k = 1; \\ \left\lfloor \frac{G^*_{sell}(t_k)}{\Delta} \right\rfloor \cdot \Delta, & \text{if } \sum_{i=1}^{k-1} \delta_{sell}(t_i) + \left\lceil \frac{G^*_{sell}(t_k)}{\Delta} \right\rceil \cdot \Delta - G^*_{sell}(t_k) < \Delta, k \geq 2; \\ \left\lceil \frac{G^*_{sell}(t_k)}{\Delta} \right\rceil \cdot \Delta, & \text{if } \sum_{i=1}^{k-1} \delta_{sell}(t_i) + \left\lceil \frac{G^*_{sell}(t_k)}{\Delta} \right\rceil \cdot \Delta - G^*_{sell}(t_k) \geq \Delta, k \geq 2; \end{cases}$$

where the following variables are defined:

"$(t_k)$" a given k-th moment of time in a series of moments $t_1, t_2, \ldots$;

"$\delta_{buy}(t_k)$"$=\hat{G}^*_{buy}(t_k) - G^*_{buy}(t_k)$; and

"$\delta_{sell}(t_k)$"$=\hat{G}^*_{sell}(t_k) - G^*_{sell}(t_k)$.

20. The non-transitory computer-readable medium of claim 18, wherein $g_{pir}(t)$, $g(t)$, $g^*(t)$, $G(t)$, $c_{pir}(t)$, $c(t)$, for moments $t=t_k$, ($k=1, 2, \ldots$) are calculated successively by the following formulas:

$g_{pir}(t_{k+1}) = g_{pir}(t_k) + \hat{G}^*_{buy}(t_k) - \text{of}_{buy}(t_k) \cdot |a(t_k)| - \hat{G}^*_{buy}(rnd(t_k - T_b)) + \text{of}_{buy}(rnd(t_k - T_b)) \cdot |a(rnd(t_k - T_b))|$;

$g(t_{k+1}) = g(t_k) + a(t_k) \cdot (1 - \text{of}_{buy}(t_k) - \text{of}_{sell}(t_k)) + \hat{G}^*_{buy}(rnd(t_k - T_b)) - \text{of}_{buy}(rnd(t_k - T_b)) \cdot |a(rnd(t_k - T_b))| - \hat{G}^*_{sell}(t_k) + \text{of}_{sell}(t_k) \cdot a(t_k)$;

$g^*(t_{k+1}) = g^*(t_k) - a(t_k) \cdot (1 - \text{of}_{buy}(t_k) - \text{of}_{sell}(t_k)) + \text{of}_{buy}(rnd(t_k - T_b)) \cdot |a(rnd(t_k - T_b))| - \text{of}_{sell}(t_k) \cdot a(t_k)$;

$G(t_{k+1}) = g(t_{k+1}) + g^*(t_{k+1})$;

$c_{pir}(t_{k+1}) = c_{pir}(t_k) + e \cdot \hat{G}^*_{sell}(t_k) - e \cdot \text{of}_{sell}(t_k) \cdot a(t_k) - e \cdot \hat{G}^*_{sell}(rnd(t_k - T_s)) + e \cdot \text{of}_{sell}(rnd(t_k - T_s)) \cdot a(rnd(t_k - T_s))$;

$c(t_{k+1}) = c(t_k) - e \cdot a(t_k) \cdot (1 - \text{of}_{buy}(t_k) - \text{of}_{sell}(t_k)) - e \cdot \hat{G}^*_{buy}(t_k) + e \cdot \text{of}_{buy}(t_k) |a(t_k)| + e \cdot \hat{G}^*_{sell}(rnd(t_k - T_s)) - e \cdot \text{of}_{sell}(rnd(t_k - T_s)) \cdot a(rnd(t_k - T_s))$;

wherein rnd(t) denotes the moment closest to t on the left in the stream of orders for purchasing/selling of the electronic currency, and at the same time by the definition the following holds true:

$rnd(t_k - T_b) = 0 \forall t_k \in [t_1; t_1 + T_b)$;

$rnd(t_k - T_s) = 0 \forall t_k \in [t_1; t_1 + T_s)$; and

"$T_b/T_s$" is time required for purchasing or selling units of gold on the external market.

* * * * *